(No Model.)
W. C. GHOLSON.
FENCE.
No. 274,118.   Patented Mar. 20, 1883.
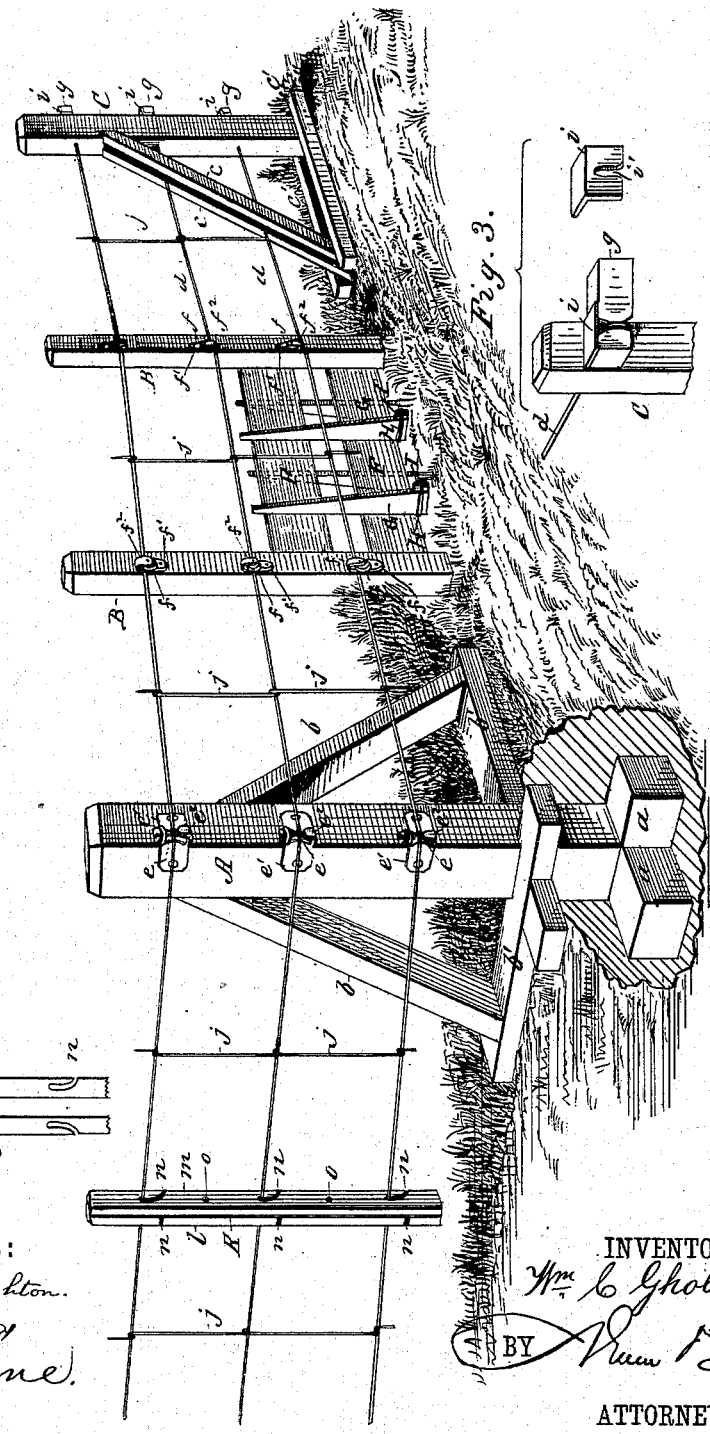
WITNESSES:
Thos. Houghton.
A. G. Syne.
INVENTOR:
Wm. C. Gholson
BY
ATTORNEYS.

UNITED STATES PATENT OFFICE.

WILLIAM C. GHOLSON, OF LA GRANGE, GEORGIA.

FENCE.

SPECIFICATION forming part of Letters Patent No. 274,118, dated March 20, 1883.

Application filed June 21, 1882. (No model.)

*To all whom it may concern:*

Be it known that I, WM. CARROLL GHOLSON, of La Grange, in the county of Troup and State of Georgia, have invented a new and useful Improvement in Fences, of which the following is a full, clear, and exact description, reference being had to the annexed drawings, forming part of this specification.

The object of this invention is to provide a wire fence in which the tension of the wires shall be equally distributed throughout their entire length, even where the ground is uneven or the direction of the fence is made to diverge laterally from a right line.

In the drawings, Figure 1 is a perspective view of my improved fence, and Figs. 2 and 3 are detail views.

The posts A B C are provided with lateral projections $a$ at their lower ends, whereby they shall be securely embedded and anchored in the ground. The corner-post A is also provided with braces $b\ b$, which rest upon horizontal pieces $b'\ b'$, secured to the post and supported upon the surface of the ground, in such manner that the post shall be firmly braced in the directions of the wires. The end post, C, is provided with two parallel braces, $c$, arranged on opposite sides of the wires $d$ and secured to two parallel pieces, $c'$, which are connected to opposite sides of the post, so as to rest upon the ground. The corner-post is provided with grooved rollers $e$, which are supported in a vertical position by means of brackets $e'$, which are provided with lips $e^2$, which are curved upward from the lower sides thereof, to prevent the wires from escaping from the rollers when for any purpose the tension of the former is relaxed. Every corner-post is to be constructed in the same manner as the post A; and it is designed that these corner-posts shall be placed as far apart as circumstances may require without the use of intermediate posts, since the greater the distance the wires are stretched over the rollers the greater will be the tension and resisting-power of the wires. When, however, the ground is uneven or hilly, or it becomes necessary to turn the direction of the fence to either side, the intermediate posts B are to be employed. These posts are provided with rollers $f$, supported in brackets $f'$, having loops $f^2$, to prevent the wires from escaping from the rollers. In passing from a lower to a higher ground the post in the lower ground is arranged near the foot or beginning of the ascent, and the brackets $f'$ are arranged thereon, with the loops $f^2$ turned downward. The wires are then passed under the rollers, respectively, in which position the loops encircle them and prevent them from becoming displaced before they are subjected to tension, and are thence passed to the post B on the higher ground and over its rollers, respectively, as shown in the drawings. In the last-named post the brackets $f'$ are arranged with the loops $f^2$ turned upward to inclose the wires. With this construction the rollers of the lower post, by being above the wires, serve to hold them near the ground against the upward strain, while the rollers of the higher post, by being under the wires, serve to prevent them from being drawn to the ground by the downward strain produced by extending the wires from a lower to a higher plane, and vice versa. With this construction, in passing corners or over uneven ground, the angles in the wires thus necessarily produced cannot bind the wires as they do where the ordinary staple is used for supporting the wire, in connection with the posts, but the rollers form an easy movable bearing, which allows the tension to be distributed along the wires for any desirable extent.

As a means of exerting tension upon the wires and holding them in the desired position, I employ the squared blocks $g$, to which the ends of the wires are respectively secured after being passed through perforations in the end post, C. These blocks are fully described in Letters Patent No. 262,035, granted to me. It is sufficient, therefore, to say that the blocks are provided with a circumferential groove, in which the wire is wound by turning the block, while the squared surface of the block is drawn against the post by the tension of the wire, and thus prevents the block from slipping and relaxing the tension. I, however, in the present application show additional means for preventing the block from turning, which consists of an angular plate, $i$, (shown best in Fig. 3,) which is provided with a slot, $i'$, in one end, adapted to fit over the wire when the plate is inserted between the post and block. The plate is thus adapted to fit close to two adjacent surfaces of the block, while the post prevents the plate and the block from turning when the tension of the wires is great.

As a means of preventing the wires from being expanded apart, I connect them by short cross-wires j, which are wrapped around each wire in such manner that they shall be arranged in a vertical position. These wires or stays are amply sufficient for preventing the wires from being expanded apart, but, owing to their flexible character, will not prevent them from being bent toward each other; and I therefore provide, in addition thereto, the wooden stays k, which are to be used at intervals along the wires, as may be desired. These stays consist of two bars or strips, l m, having slots n, which are cut into one edge thereof and extended upward a short distance near the longitudinal center. The bars are then placed on the wires separately, being adjusted to the wires from opposite sides thereof, so that when they are secured together by pins o they cannot be lifted out of engagement with the wires. These stays k serve to prevent the wires from being bent toward each other as well as from being expanded apart, and thus serve, in connection with the wire stays, to hold the wires in proper position. As the wire stays are cheaper, they will be used chiefly, while the wooden stays will be used only at longer intervals, to supplement the wire stays.

When the fence is to be used to confine small animals, boards F are to be placed below and between the lower wires and secured in position by uprights G, which are provided with metallic loops H at their bases, and are held in position by pins I, which are driven through the loops into the ground. The boards are nailed to the edges of the uprights, which are arranged on opposite sides of the fence.

Having thus described my invention, what I claim, and desire to secure by Letters Patent, is—

1. The combination, with the wires, of the posts having projections at their lower ends to anchor them in the ground, and braces supported on pieces which rest upon the ground and are connected to the posts, substantially as shown and described.

2. The combination, in a fence, of the corner and end posts, anchored and braced as described, the rollers attached to the corner-posts, the wires placed in engagement with the rollers and passed through perforations in the end posts, the squared blocks connected to the ends of the wires and adapted to wind the same, and the angular slotted plates adapted to be placed between the end posts and the blocks, to prevent the latter from turning, substantially as shown and described.

3. The combination of the wires, the anchored posts, the squared blocks, and the rollers supported in brackets, having curved lips to prevent the wires from escaping from the rollers, substantially as shown and described.

4. The combination, in a fence, of the wires and posts, the boards arranged below and between the lower wires, and the uprights arranged on opposite sides of the boards and nailed thereto, and having loops at their lower ends, through which pins are driven to hold them to the ground, substantially as shown and described.

WILLIAM C. GHOLSON.

Witnesses:
A. G. LYNE,
SOLON C. KEMON.